HOWARD & WILFONG.
Hay Elevating Fork.

No. 37,965. Patented March 24, 1863.

Witnesses
H. Albert Steel.
Charles E. Foster.

Inventor
Henry Howard
Alley Howard & Wilfong

UNITED STATES PATENT OFFICE.

GEORGE C. HOWARD AND ISAAC N. WILFONG, OF PHILADELPHIA, PA.

IMPROVEMENT IN HAY-ELEVATING FORKS.

Specification forming part of Letters Patent No. 37,965, dated March 24, 1863.

*To all whom it may concern:*

Be it known that we, GEORGE C. HOWARD and ISAAC N. WILFONG, both of Philadelphia, Pennsylvania, have invented an Improvement in Hay-Elevators; and we do hereby declare the following to be a full, clear, and exact description of the same, reference being had to the accompanying drawings, and to the letters of reference marked thereon.

Our invention consists of a cap formed and adapted to the stem of a hay-elevator, and arranged for being locked to and unlocked from the bail, in combination with a spiral spring contained in a recess formed in the said stem, the whole being arranged and operating, substantially as described hereinafter, so that the said spring may be effectually protected from exposure and accidental blows, and so that no dirt, stalks, &c., can gain access to the spring and interfere with its proper action.

In order to enable others to make our invention, we will now proceed to describe its construction and operation.

Figure 1:
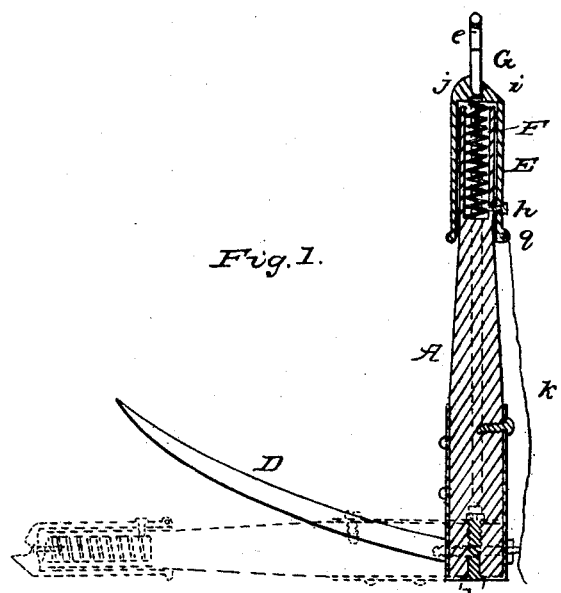
Figures 2, 3:
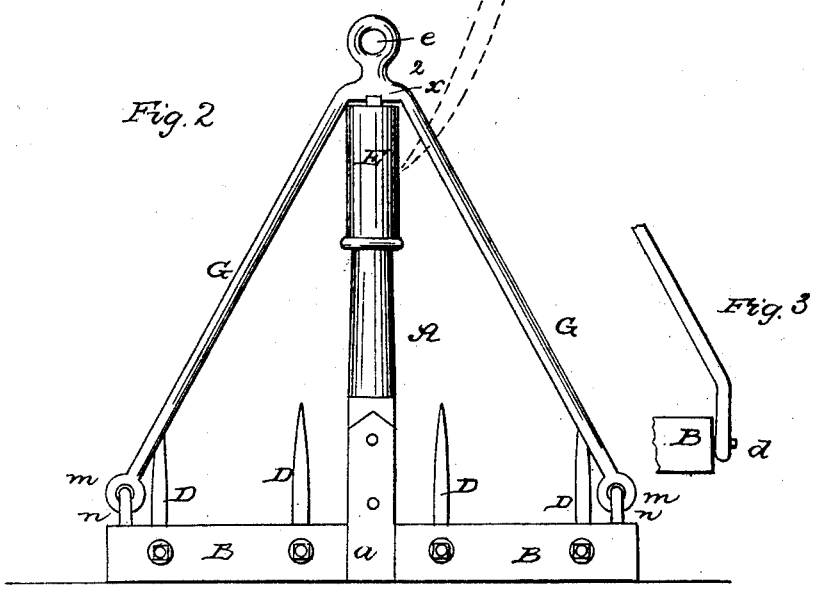

On reference to the accompanying drawings, which form a part of this specification, Figure 1 is a vertical section of our improved hay-elevator; Fig. 2, a rear view of the same, and Fig. 3 a modification of part of the elevator.

Similar letters refer to similar parts throughout the several views.

A is the stem of the elevator, and to this stem the cross-bar B is permanently secured by means of a metal strap, *a*, and screw *b*, or such other fastenings as the constructer may deem most appropriate.

To the front of the cross-bar are secured four or any other suitable number of curved prongs, D, the form of which will be best observed on reference to Fig. 1.

E is a hollow cylindrical cap, closed at the top, and of such internal diameter as to fit freely over the upper end of the stem A, in which is a recess for the reception of the spiral spring F, the latter bearing against the cap E and tending to elevate the same.

G is the bail, one leg of which is hinged to one end and the other leg to the opposite end of the cross-bar D, each leg having an eye, *m*, linked to another eye, *n*, secured to the cross-bar; or the legs may be connected to the cross-bar in the manner illustrated in Fig. 3, which will be readily understood without minute description. The bail G terminates at the top in an eye, *e*, to which the hoisting-tackle is attached, and below this eye a portion, *x*, of the bail is made straight, as seen in Fig. 2, the form of this portion of the bail being rounded when viewed transversely, as seen in Fig. 1, and adapted to a concave recess formed in the top of the cylindrical cap E by the two rounded projections *i* and *j*, the latter of which is more prominent than the former. A small pin, *h*, screwed into the cylindrical cap E, projects into an oblong slot in the stem A, and serves to prevent the cap from turning, at the same time permitting it to move up and down to a limited extent. A cord or chain, *k*, is attached to an eye, *q*, formed in the lower end of the cylindrical cap E. While the several parts are in this position the apparatus is in a condition to be used for collecting a mass of hay on its prongs D, and for elevating this mass of hay to the desired point.

When the hay has to be discharged from the elevator the cord or chain *k* is pulled, the cylindrical cap E thereby depressed, and the portion *x* of the bail consequently released from the recess in the cap, after which the stem, cross-bar, and prongs will fall by the weight of the mass of hay, and assume such a position that the load will be at once discharged. On restoring the stem to its former position in respect to the bail the rounded projection *i* will strike the portion *x* of the said bail, thereby causing a depression of the cylindrical cap E until the recess in the latter coincides with the said portion *x* of the bail, when by the recoil of the spring F the cap is elevated, the stem locked to the bail, and the apparatus is again in a condition to be used for collecting and elevating masses of hay.

We are aware that various devices have been heretofore used—such as latches or bolts and springs—for locking the stems to the bails of hay-elevators and releasing the same. Hitherto, however, the locking and releasing devices have been so situated and arranged as to become deteriorated by exposure, injured by accidental blows, or obstructed in their action by accumulation of dirt, &c.

It will be seen that in my improvement the spring is inclosed and effectually protected from damage by exposure; that no particles of dirt, small pieces of stalks, &c., can gain access to the spring and interfere with its free action. At the same time the locking device is simple in construction and direct in its action.

It is not essential that the cap E should be in the form of a hollow cylinder. It may, if desired, be square, or of any form to suit that of the stem.

We claim as our invention and desire to secure by Letters Patent—

The cap E, formed and adapted to the stem A, and arranged for being locked to and unlocked from the bail, substantially as described, in combination with a spiral spring, F, contained in a recess formed in the said stem, the whole being arranged and operating substantially as and for the purpose herein set forth.

In testimony whereof we have signed our names to this specification in the presence of two subscribing witnesses.

GEO. C. HOWARD.
ISAAC N. WILFONG.

Witnesses:
HENRY HOWSON,
JOHN WHITE.